United States Patent [19]

Takiguchi et al.

[11] Patent Number: 5,485,149
[45] Date of Patent: Jan. 16, 1996

[54] REMOTE CONTROLLER AND METHOD FOR ASSIGNING TO SIGNALS PRIORITY BASED ON TYPE AND MANUFACTURE OF EQUIPMENT

[75] Inventors: Iwao Takiguchi, Chiba; Toshiyuki Takahashi, Kanagawa, both of Japan

[73] Assignee: Sony Corporation, Tokyo, Japan

[21] Appl. No.: 74,092

[22] Filed: Jun. 9, 1993

[30] Foreign Application Priority Data

Jun. 18, 1992 [JP] Japan ................................ 4-182846

[51] Int. Cl.$^6$ ............................................ H04B 1/20
[52] U.S. Cl. ........................... 340/825.69; 340/825.72; 340/825.56; 359/148
[58] Field of Search ..................... 340/825.69, 825.72, 340/825.24, 825.25, 825.56; 348/734; 359/148; 341/27

[56] References Cited

U.S. PATENT DOCUMENTS 4,694,725 9/1987 Seevers et al. .......................... 341/27
4,703,359 10/1987 Rumbolt et al. .................... 340/825.69
4,774,511 9/1988 Rumbolt et al. .................... 340/825.69
4,843,386 6/1989 Wolf .................................. 340/825.72
4,866,434 9/1989 Keenan ............................. 340/825.69
4,999,622 3/1991 Amano et al. ..................... 340/825.72

FOREIGN PATENT DOCUMENTS 0314177 5/1989 European Pat. Off. .
0122548 10/1984 Germany .

*Primary Examiner*—Michael Horabik
*Attorney, Agent, or Firm*—Lise A. Rode; Robert P. Biddle; Jerry A. Miller

[57] ABSTRACT

Remote control signals for a plurality of manufacturers and a plurality of electronic equipment are stored in a memory, the remote control signals are divided into groups, each of the groups is allotted to each of operating keys on a body of a remote controller and various remote control signals which may exist within the group are allocated to a number of times which the operating keys are pressed. The groups and any remote control signals existing within the group are stored in order of priority.

16 Claims, 5 Drawing Sheets

| Key Number \ No. of Times | 1 | 2 | 3 | 4 |
|---|---|---|---|---|
| 1 | A Corp. $C_{A1}$ | A Corp. $C_{A2}$ | | |
| 2 | B Corp. $C_{B1}$ | B Corp. $C_{B2}$ | B Corp. $C_{B3}$ | B Corp. $C_{B4}$ |
| 3 | C Corp. | | | |
| 4 | D Corp. | | | |
| 5 | E Corp. $C_{E1}$ | E Corp. $C_{E2}$ | | |
| 6 | F Corp. | | | |
| 7 | G Corp. | | | |
| 8 | H Corp. $C_{H1}$ | H Corp. $C_{H2}$ | H Corp. $C_{H3}$ | |
| 9 | I Corp. $C_{I1}$ | I Corp. $C_{I2}$ | | |
| 10 | J Corp. | | | |
| 11 | K Corp. $C_{K1}$ | K Corp. $C_{K2}$ | | |
| 12 | L Corp. | | | |

FIG.3

| Key Number \ No. of Times | 1 | 2 | 3 | 4 |
|---|---|---|---|---|
| 1 | A Corp. $C_{A1}$ | A Corp. $C_{A2}$ | | |
| 2 | B Corp. $C_{B1}$ | B Corp. $C_{B2}$ | B Corp. $C_{B3}$ | B Corp. $C_{B4}$ |
| 3 | C Corp. | | | |
| 4 | D Corp. | | | |
| 5 | E Corp. $C_{E1}$ | E Corp. $C_{E2}$ | | |
| 6 | F Corp. | | | |
| 7 | G Corp. | | | |
| 8 | H Corp. $C_{H1}$ | H Corp. $C_{H2}$ | H Corp. $C_{H3}$ | |
| 9 | I Corp. $C_{I1}$ | I Corp. $C_{I2}$ | | |
| 10 | J Corp. | | | |
| 11 | K Corp. $C_{K1}$ | K Corp. $C_{K2}$ | | |
| 12 | L Corp. | | | |

| Key Number | Command Signal Group |
|---|---|
| 1 | A Corp. |
| 2 | B Corp. Code $C_{s1}$ |
| 3 | C Corp. |
| 4 | D Corp. |
| 5 | E Corp. |
| 6 | F Corp. |
| 7 | G Corp. |
| 8 | H Corp. |
| 9 | I Corp. |
| 10 | B Corp. Code $C_{s2}$ |

FIG. 6 (PRIOR ART)

| Key Number | | Command Signal Group |
|---|---|---|
| 1 | 1 | A Corporation Code $C_{A1}$ |
| 1 | 2 | A Corporation Code $C_{A2}$ |
| 1 | 3 | A Corporation Code $C_{A3}$ |
| 2 | 1 | B Corporation Code $C_{B1}$ |
| 2 | 2 | B Corporation Code $C_{B2}$ |
| 2 | 3 | B Corporation Code $C_{B3}$ |
| 3 | 1 | C Corporation Code $C_{C1}$ |
| 3 | 2 | C Corporation Code $C_{C2}$ |
| 4 | 1 | D Corporation |
| 5 | 1 | E Corporation |
| 6 | 1 | F Corporation |
| 7 | 1 | G Corporation |
| 8 | 1 | H Corporation |
| 9 | 1 | I Corporation |
| 10 | 1 | J Corporation Code $C_{J1}$ |
| 10 | 2 | J Corporation Code $C_{J2}$ |
| 11 | 1 | K Corporation Code $C_{K1}$ |
| 11 | 2 | K Corporation Code $C_{K2}$ |
| 12 | 1 | L Corporation |

REMOTE CONTROLLER AND METHOD FOR ASSIGNING TO SIGNALS PRIORITY BASED ON TYPE AND MANUFACTURE OF EQUIPMENT

BACKGROUND OF THE INVENTION

1. Field of the Invention

This invention relates to a remote controller for remotely operating electronic equipments.

2. Description of the Related Art

Remote controllers which use infrared and electromagnetic waves to transmit modulated control data to remotely control electronic equipments such as, for example, televisions, stereos, and VTRs (Video Tape Recorders) are well known.

For example, as is shown in FIG. 4, an infrared remote controller is well known which has a light transmitter 1 consisting of an infrared light transmitting element and an infrared transmission filter at its front end, and a number of operating keys 2 on its upper surface. Each of the operating keys 2 will then operate an electrical appliance so that, for example, the key PW could turn the electric supply on and off, and the keys numbered [1] to [12] could then represent television channels.

When a signal which is attained by modulating a fixed frequency carrier and is then transmitted as infrared the pulse bit periods, frame structures and coding systems are different depending on the format adopted, and there are a lot of cases where these formats vary with the maker, model or year in which the electrical appliance was made. As the remote controller has to be exclusively prepared in accordance with each various electrical appliance, the user has to set up the remote controller so that it can be used with the electrical appliance which it is desired to use.

In response to this situation remote controllers have been put forward which can output control signals having different formats and code systems for various maker and models of electronic equipment.

With this kind of remote controller, as shown in a table of FIG. 5, the control signal groups for the electronic equipment corresponding to each of the makers (A corporation—I corporation) are pre-stored in, for example, a ROM. When a corporation such as B corporation then has two kinds of control signal groups having differing formats and/or code systems (code CB1 and code CB2) these are then pre-stored separately.

Each control signal group is then allotted to a numbered key and the user can then call up the desired control signal group by the select set up operation. For example, if key number [1] and the PW key are pressed together, the control signal group with the format and code system adopted by A corporation will be selected, and when the operation keys 2 of the remote controller are subsequently pressed, the control signals for A corporations electronic equipment will be outputted.

It is common knowledge that a controller with the functions described above commonly known as a preset remote controller is disclosed in U.S. Pat. No. 4,774,511.

Also, in another kind of remote controller which is also well known, a number of remote control signals which are stored in the memory are read out from the memory and transmitted one after another by operating one of the operating buttons so that it can then be decided which of these remote control signals is suitable to be used with the apparatus. When a suitable remote control signal is selected that selection is then stored in a memory.

This kind of function, which is commonly known as a search preset function, is disclosed forward in, for example, U.S. Pat. No. 4,703,359.

In this way, if remote control signals corresponding to a number of formats, a number of makers and a number of categories are pre-stored in the memory, by operating a prescribed operating key, the remote control signals stored in the memory can be read out and transmitted one after another from the memory, and a remote control signal which can be confirmed to be capable of operating the apparatus to be controlled can be found.

With the preset remote controller described above, each type of control signal group is preset into the unit. This means that, for example, by setting up appliance modes by using a select set up operation which employs the numbered keys, the number of control signal groups which can be preset is limited to the number of operating keys 2 (i.e. the number of numbered keys) present.

Also, if there are a very large number of kinds of control signal groups then, for example, if just twelve presets are assigned to certain control signal groups then there will still be groups which cannot be preset, and the remote controller will therefore not be able to operate the electronic equipment corresponding to these leftover groups.

When presetting using numbered keys for a large number of types of control signal groups, it is possible to store the control signal groups by using two or more numbered keys corresponding to each control signal group, as shown in the example in FIG. 6. In this case, if, for example, the user holds down the key PW and then presses key [1] and key [2], the control signal group CA2 having the code system and format for A corporation will be selected.

By doing this it will be possible to store almost any number of types of control signal formats and codes, although this will of course depend on the amount of memory space available in the ROM.

This does however present the problem that the select setting operation is very complicated. Also, the user may understand the name of the maker of the electronic equipment being used but is unlikely to have an understanding that goes as far as knowing the control signal format and control system.

Also, the user will not know which of three codes such as the three codes CB1–CB3 shown in FIG. 6 for the products of B corporation should be selected, and so will therefore have to repeat the complicated select setting procedure until the correct control signal for operating that product has been output.

If the user cannot manage to transmit the desired control signal format and code, then the search preset function described previously can still be used as the remote control signal preset method. However, with remote controllers which have a search preset function, for the case where a remote control signal is to be read out from memory, when the user operates the operating key the remote control signals including the formats and control systems for the various makers may not correlate with those for conventional systems. It would therefore be best if the desired remote control signal were to be read out near the beginning of the sequence from which the remote control signals are read out from the memory, but this would probably not be the case. It would probably then be necessary to have to continue to press the operating button until the correct remote control signal is read out from the memory.

Storing a large number of types of control signal groups randomly as presets would therefore be would be detrimental to the operativity of the device.

SUMMARY OF THE INVENTION

In order to solve these problems, an object of the invention is to provide a remote controller which is capable of storing as presets a plurality of types of control signal groups in a manner which is not detrimental to the operativity of the select setting process for these control signal group presets.

According to the invention, there is provided a remote controller comprising a first storage means for storing a plurality of control signal groups corresponding to the various types of electronic equipments, a plurality of operating means for selecting the control signals for a control signal group to be selected from a plurality of control signal groups and a control means for making an output in accordance with all the various input operations. By classifying which of the operating means has been pressed and working out how many times it has been pressed, the remote controller will designate one of a plurality of control signal groups in the select setting operation to the item, and will thus be able to operate various kinds of electronic equipment.

More particularly, with regards to the plurality of control signal groups within the storage means, one or more of these control signal groups will be assigned to each one of the operating means, and when selecting one from a number of control signal groups assigned to a single operating means, each pressing of the operating means will bring up one particular control signal group.

Also, each of the control signal groups assigned to an operating means will be given a priority, with the lowest number of presses bringing forward the control signal group of the highest priority.

By designating a control signal group to a position in a matrix which corresponds to the number of times a particular operating means is pressed, a large number of types of control signal groups can be preset, as this storage operation is not limited to the number of operating means present. Also, a user select setting operation can be made easy by having each operating means represent a particular maker and by then having each number of times that operating means is pressed represent each of that particular makers control signal groups with its differing formats and code systems. Again, this would be set up so that the most popular model by a particular maker would correspond to the lowest number of presses of the operating means.

BRIEF DESCRIPTION OF THE DRAWINGS

In the accompanying drawings:

FIG. 3 is a view describing the way in which the control signal group presets are set out for the remote controller in the embodiment;

FIG. 6 is a further view describing the way in which the control signal group presets are set out for the remote controller in the related art.

DESCRIPTION OF THE PREFERRED EMBODIMENTS

First Embodiment

Figure 1:
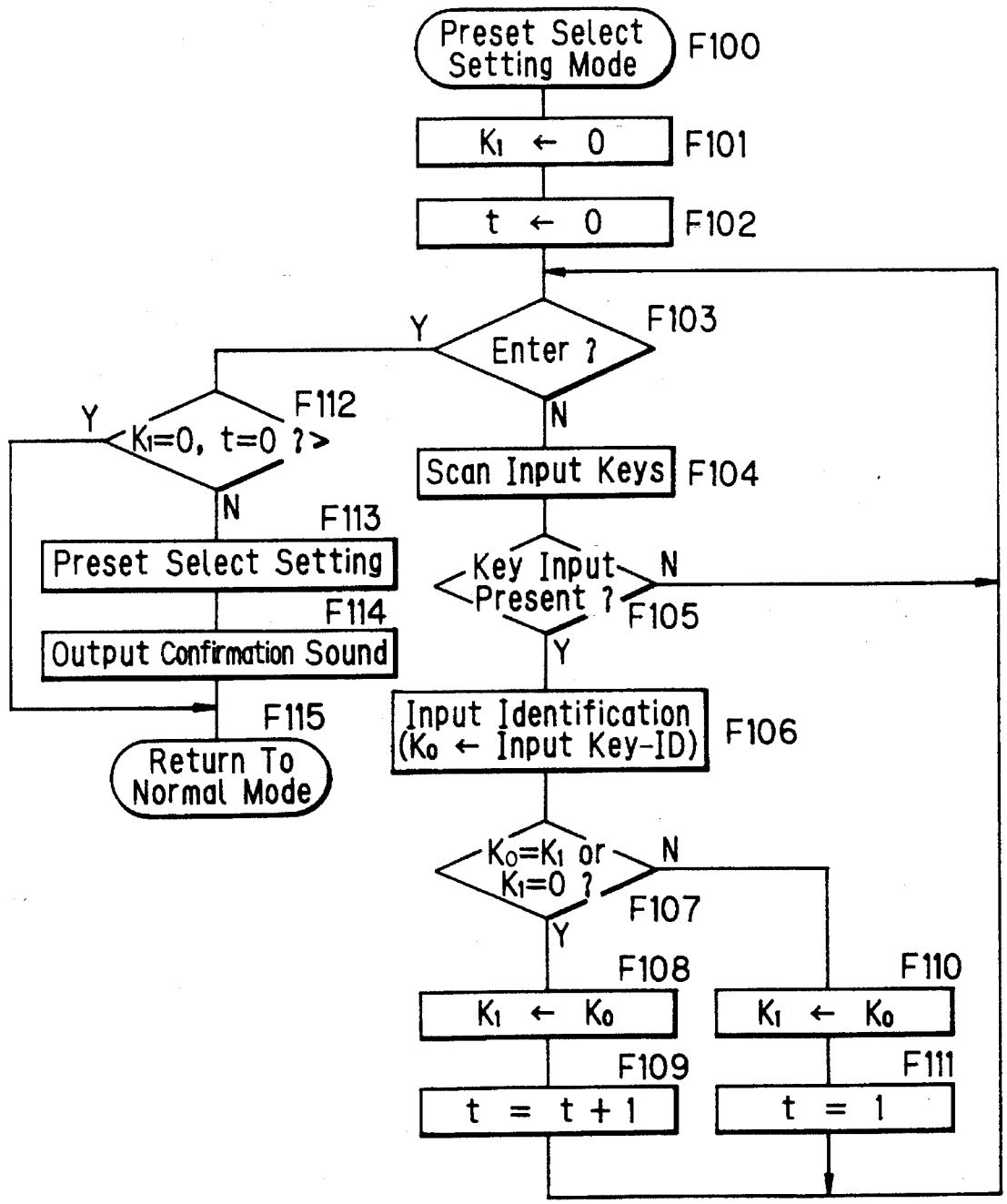
FIG. 1 is a flowchart of the control signal group select setting process for an embodiment of the present invention.
Figure 2:
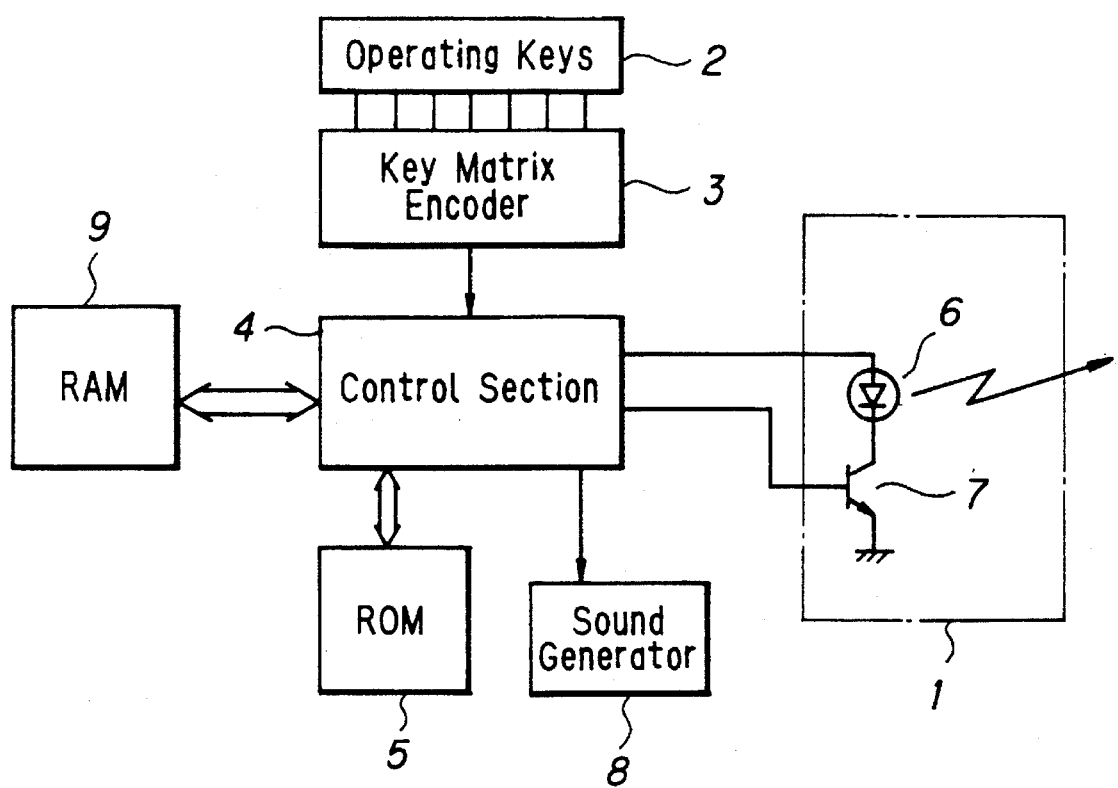
FIG. 2 is a block diagram of the construction of the remote controller in the embodiment.
Figures 4, 5:
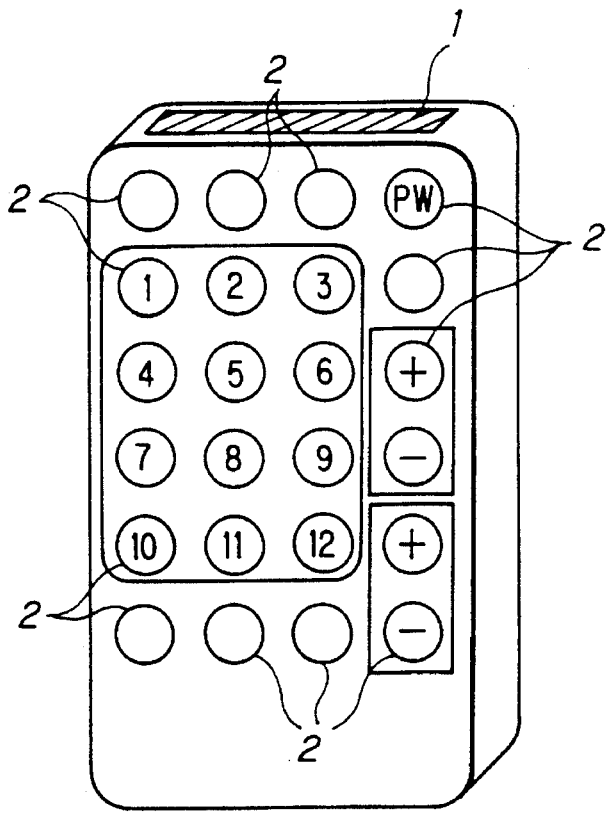
FIG. 4 is a perspective view of the remote controller.
FIG. 5 is a view describing the way in which the control signal group presets are set out for the remote controller in the related art.

The following is a description with reference to FIGS. 1–3 of an embodiment of the present invention. The external appearance of the remote controller will be the same as that in FIG. 4.

FIG. 2 is a block diagram of the remote controller according to this embodiment. Here, the numeral 2 indicates operating keys as it does in FIG. 4, and there are numbered operating keys [1]–[12] for the preset control signal group select setting operations to be described later, as well as a PW key. Numeral 3 indicates a key matrix encoder for outputting the information input by the user via the operating keys 2. Numeral 4 indicates a microcomputer-based control unit which selects and outputs the desired control signal according to the operation input information provided by the key matrix encoder 3. Numeral 5 indicates an ROM (Read Only Memory). Various formats and code systems are adopted by different makers for their various models of electronic equipment and this ROM therefore contains preset data which cover this large number of control signal groups. The user can then select one control signal group from the data by using the select setting operation.

The control signal for the control signal group selected is then put into an RAM (Random Access Memory) 9. In the following, when an operating key 2 is pressed, the control signal for the control signal group selected is read from the RAM and then outputted.

Also, in another embodiment, the control signal for the control signal group selected is not put into the RAM 9 but can instead be stored in an address in the ROM 5. It is also preferable if the RAM 9 used for storing back up data is a non-volatile type RAM.

In a light emitter 1, numeral 6 indicates an LED (light emitting diode) driven infrared output section for outputting infrared light, and numeral 7 indicates an LED driver. When the control section 4 wishes to output a control signal (i.e. a signal which is a control signal which has been modulated by a fixed carrier), the control section 4 uses the on/off switching function of an LED drivers 7 driving transistor to turn the infrared output section 6 on and off, which in turn outputs the control signal via infrared light.

Numeral 8 represents a sound generator which is controlled by the control section 4 to produce sounds such as electronically produced sounds.

The control preset groups are stored in the ROM 5 as information for the keys numbered [1]–[12] as well as information concerning multiple presses of these keys.

For example, the keys numbered [1]–[12] could represent the corporations A to L and then each additional pressing operation will represent each of the various codes that corporation has adopted for its various electronic equipments. To illustrate this, key number 1 could correspond to the control signal group which the corporation A uses for its products, with the two types of formats and code systems used by the corporation then being brought forward by pressing the key once for code CA1 and twice for code CA2.

For cases such as A corporation, B corporation and E corporation where two or more types of code are adopted, the type of code which is most commonly adopted by that corporation will correspond to the first pressing of the key, with the second most commonly adopted corresponding to the second pressing of the key, and so on.

This kind of select setting operation for the preset data i.e., the control signal group in the remote controller, will be described in conjunction with the flowchart in FIG. 1.

The select setting operation is enabled by, for example, pressing the PW (power) key and a numbered key at the same time.

When the PW key and a numbered key are pressed at the same time, the control section 4 goes from normal control signal output mode into preset select setting mode (F100) and the variables K1, K0 and t are set, with K1 and t being set to zero (F101, F102). Here, the variable K1 will hold the ID (Identification Code to classify the keys [1]–[12]) of the numbered key which had been most recently pressed during the period of the preset select setting mode. The variable K0 is the key number ID for the key currently being pressed and the variable t represents the number of times the same key has been continued to be pressed.

In the preset select setting mode, the control section 4 recognizes when the PW key is no longer being pressed and at this point will embark upon the enter operation. If the PW key is released without a numbered key having been pressed while it was held down, i.e. the variables K1 and t are zero, there will not have been any new select setting operation and the system will return to normal mode. The control signal group selected in the previous select setting will then be outputted for any subsequent key operations (F103→F112→F115).

While the PW key is being held down, a loop scan of the input keys is taking place to see if any keys have been pressed (F103, F104, F105). If there is an input corresponding to the operation of one of the numbered keys, it is first determined which of the keys [1]–[12] has been pressed, and the constant K0 is set to this key ID (F106). Also, if K1=K0, K1=0, a certain key corresponding to a certain maker is pressed once or a number of times, or a numbered key other than the numbered key which had been most recently pressed during the previous period of the preset select setting mode is pressed, a confirmation will be outputted. Cases such as the user pressing the wrong key and then pressing the correct key after having pressed the wrong key must also be taken into account.

In this kind of case, the ID variable K1 for the numbered key pressed just beforehand is replaced with the ID for the key most currently pressed (F110), and the variable t is set to t=1 (F111). The number of times the new key has been pressed is then determined in the following way. When the process continues through steps F107 and F108, the next stage is to detect how many times the key has been pressed. When the variable K1=0 (i.e. one press), the variable K1 is set to the ID of the currently inputted numbered key and the variable t is incriminated. The step F109 then ensures that the variable t will display the number of times the same key has been pressed after subsequent pressings of the button.

When the PW key is no longer being pressed, the enter operation is embarked upon and at the same time the variable K1 is set to the value of the key number ID. The control signal group to be selected is then identified by using the information about the number of times the key has been pressed represented by the variable t to refer to the matrix shown in FIG. 3. The remote control signal is then set up in the RAM 9 so that the control output operations are carried out according to the control signal group selected (F113). A confirmation sound is then output from the sound generator 8 to confirm to the user that the control signal group select set up operation has been completed (F114) and the system returns to normal mode (F115).

In case where a numbered key is pressed more than the number of stored preset times, for example, in FIG. 3, if key number [1] is pressed three times or more, or key number [3] is pressed two times or more, the control signal group which is allotted to the highest number of allowed presses will be selected. It follows that if key number [1] is pressed three times or more then A corporations code CA2 will be selected and that if key number [3] is pressed a number of times then, as this key only has one kind of control signal group for its corresponding corporation, that signal group will be selected.

In this way, when the keys are pressed more than the number of times for which there are presets the user will not become confused because this system does not, for example, return to normal operating conditions after just one press of the keys. For example, as the user realizes that there is only a few preset control signal groups for this particular maker it should become understood that this is not, in fact, a particularly complicated process. If, at this stage, taking corporation B as an example, pressing key number [2] five times brings up B Corporations code CB1 and pressing it six times brings up B Corporations code CB2 so that the codes are then sequentially repeated, it is easy for the user to no longer be aware of which code is being dealt with. Also, having to press the wrong key a number of times and then having to reset again could make the user feel apprehensive about the set up process. It is therefore preferable to have the sound generator emit a warning noise when a key has been pressed the predetermined number of times.

In the remote controller according to this embodiment, the select setting process involves designating control signal groups to the numbered keys and the multiple repetitive operations of the numbered keys. In this way, it is possible to store as presets a number of control signal groups which exceeds the number of actual numbered keys. A remote controller which is suitable for most of the models made by the majority of makers can therefore be attained. Having a numbered key for each corporation also means it is easy for the user to discriminate between the various makers and even if that maker has adopted a number of codes, it is possible to select the desired code in a simple manner by repeatedly pressing the corresponding key.

Also, as the codes which are used the most correspond to the lower numbers of operations of the keys, it is simple to use for a very large number of users.

It is also possible to have the same kind of control signal group with its format and control system preset within different positions in the matrix. For example, A corporations code CA1 and J corporations code may be the same but they could still be recalled using different numbered keys so that the user does not get confused when carrying out the select set up operation.

The select set up operation is not simply limited to the use of numbered keys as the operation keys. Also, the select set up process is not just limited to the process flow shown in FIG. 1.

Further, the operation keys in this embodiment correspond to corporations, but other variations are also possible. For example, the operating keys could be made to correspond to various makers of electronic equipment such as televisions, video tape recorders (VTRs), and compact disc players, and the number of times the keys are pressed could then correspond to the various models produced by that particular maker.

What is claimed is:

1. A remote controller comprising:

transmitter means for transmitting remote control signals;

first storage means for storing a plurality of remote control signal groups, each of said remote control signal groups comprising data representing a respective plurality of associated remote control signals;

a plurality of actuatable operating means for selecting upon actuation a remote control signal group from said first storage means, said plurality of remote control signal groups being greater in number than said plurality of actuatable operating means;

control means for reading from said first storage means, data of the remote control signals of the remote control signal group corresponding to a most-recently actuated one of said plurality of actuatable operating means, said remote control signals being selected according to the number of times said most-recently actuated one of said plurality of actuatable operating means has been actuated, and, second storage means for storing the data of said selected remote control signals read from said first storage means, wherein upon subsequent actuation of any of said plurality of actuatable operating means, said control means causes data of said selected remote control signals to be transmitted by said transmitter means.

2. The remote controller according to claim 1, further comprising means for allowing a user to selectively input a signal to discriminate whether or not the data of the remote control signals of said remote control signal group corresponding to said most-recently actuated one of said plurality of actuatable operating means should be stored in said second storage means.

3. The remote controller according to claim 1, wherein said plurality of remote control signal groups are associated with respective manufacturers of equipment that are controllable by said remote controller, and the number of said plurality of remote control signal groups is greater than the number of manufacturers.

4. The remote controller according to claim 1, wherein said data of the remote control signals to be read from said first storage means are read and controlled according to the number of times said most-recently actuated one of said plurality of actuatable operating means has been actuated, in a predetermined order of priority according to a market share of the equipment manufactured.

5. The remote controller according to claim 1, wherein said remote control signals to be read from said first storage means are read and controlled, according to the number of times said most recently actuated one of said plurality of actuable operating means is actuated, in a predetermined order of priority according to a market share of the equipment manufactured.

6. The remote controller according to claim 1, wherein said data of the remote control signals are read from said first storage means, according to the number of times said most-recently actuated one of said plurality of actuatable operating means is actuated, in a predetermined order of priority according to a market share of the manufacturer of the equipment to be controlled.

7. The remote controller according to claim 1, wherein the data of the remote control signals are read from said first storage means, according to the number of times said most-recently actuated one of said plurality of actuatable operating means is actuated, in an order which is in accordance with the degree of use of the format of the remote control signals.

8. The remote controller according to claim 1, further comprising warning means for issuing a warning when the number of times the corresponding most-recently actuated one of said plurality of actuatable operating means is actuated is greater than the number of said remote control signal groups assigned to said corresponding most-recently actuated one of said plurality of actual operating means.

9. The remote controller according to claim 8, wherein said warning means includes means for generating an audible warning.

10. The remote controller according to claim 1, wherein said first storage means and said second storage means comprise a ROM and a RAM, respectively.

11. A remote controller comprising:

transmitter means for transmitting remote control command signals;

first storage means for storing a plurality of remote control signal groups, each of said remote control signal groups comprising remote control signal data corresponding to a respective plurality of remote control command signals;

a plurality of user actuatable operating means fewer in number than said plurality of remote control signal groups, whereby upon actuation of one of said plurality of user actuatable operating means a predetermined number of times a corresponding one of said remote control signal groups is selected;

a controller comprising means for reading from said first storage means said remote control signal data of a predetermined remote control signal group corresponding to the most-recently actuated one of said plurality of actuatable operating means in accordance with the number of times said most-recently actuated one of said plurality of actuatable operating means has been actuated, means for causing said remote control signal data read from said first storage means to be stored into a second storage means;

means for controlling said transmitter so as to transmit a remote control command signal represented by said remote control signal data stored in said second storage means; and, alarm means for generating an audible signal upon actuation of one of said plurality of actuatable operating means.

12. A method of generating a remote control signal comprising the steps of:

storing remote control signal data into a first memory means as a plurality of remote control signal groups, each of said groups corresponding to a different equipment operating format;

associating a predetermined number of actuations of each of a plurality of user actuatable operating means with a respective one of said plurality of remote control signal groups, wherein the number of user actuatable operating means is fewer than the number of remote control signal groups;

initiating a pre-select mode during which remote control signal data can be read from said first memory means;

actuating a desired one of the plurality of user actuatable operating means corresponding to the remote control signal group of the desired remote control signal the predetermined number of times to read data for the desired remote control signal from said first memory means;

storing said remote control signal data from said first memory means into a second memory means; and, transmitting the desired remote control signal in accordance with said remote control signal data stored in said secondary memory means.

13. A method of generating a remote control signal according to claim 12 further comprising the step of activating an audible alarm signal each time one of said operating means as actuated.

14. A method of generating a remote control signal according to claim 12 wherein each of said plurality of remote control signal groups corresponds to remote control signal data of a particular equipment manufacturer.

15. A method of generating a remote control signal according to claim 12 wherein each of said plurality of remote control signal groups corresponds to remote control signal data of a particular category of remotely controllable equipment.

16. A method of generating a remote control signal according to claim 12 wherein each of said plurality of remote control signal groups corresponds to remote control signal data of a particular remote control signal format.

* * * * *